(12) United States Patent
Wilmes et al.

(10) Patent No.: US 7,313,538 B2
(45) Date of Patent: Dec. 25, 2007

(54) TRANSACTION TAX SETTLEMENT IN PERSONAL COMMUNICATION DEVICES

(75) Inventors: Robert Wilmes, Scottsdale, AZ (US); Fred Bishop, Glendale, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 638 days.

(21) Appl. No.: 10/076,337

(22) Filed: Feb. 15, 2002

(65) Prior Publication Data

US 2002/0116302 A1     Aug. 22, 2002

Related U.S. Application Data

(60) Provisional application No. 60/269,108, filed on Feb. 15, 2001.

(51) Int. Cl.
*G06Q 40/00* (2006.01)
(52) U.S. Cl. .......................... 705/31; 705/19
(58) Field of Classification Search ............. 705/19, 705/31
See application file for complete search history.

(56) References Cited

U.S. PATENT DOCUMENTS

| | | | |
|---|---|---|---|
| 5,253,345 A * | 10/1993 | Fernandes et al. ............ 705/17 |
| 5,335,169 A * | 8/1994 | Chong ........................... 705/31 |
| 5,359,528 A | 10/1994 | Haundel et al. |
| 5,528,518 A | 6/1996 | Bradshaw et al. |
| 5,557,524 A | 9/1996 | Maki |
| 5,559,520 A | 9/1996 | Barzegar et al. |
| 5,644,724 A | 7/1997 | Cretzler |
| 5,694,322 A | 12/1997 | Westerlage et al. |
| 5,774,872 A | 6/1998 | Golden et al. |
| 5,781,871 A | 7/1998 | Mezger et al. |
| 5,799,283 A | 8/1998 | Francisco et al. |
| 5,819,249 A * | 10/1998 | Dohanich et al. ............. 706/46 |
| 5,875,433 A | 2/1999 | Francisco et al. |
| 5,890,068 A | 3/1999 | Fattouche et al. |
| 5,960,411 A | 9/1999 | Hartman et al. |
| 5,970,481 A | 10/1999 | Westerlage et al. |
| 5,974,356 A | 10/1999 | Doyle et al. |
| 5,987,429 A | 11/1999 | Maritzen et al. |
| H1830 H * | 1/2000 | Petrimoulx et al. ........... 705/31 |

(Continued)

OTHER PUBLICATIONS

Unpublished specification for U.S. Appl. No. 09/704,379, filed Nov. 2, 2002, entitled "System and Method for Facilitating Commercial Transactions Between Parties Residing at Remote Locations".

*Primary Examiner*—Gerald J. O'Connor
(74) *Attorney, Agent, or Firm*—Snell & Wilmer L.L.P.

(57) ABSTRACT

A transactional tax settlement system for use with a personal communication device is provided. The system has particular usefulness in determining a taxing authority and calculating a tax rate imposed by the taxing authority in a communication network environment. The system may be used to determine a tax authority and corresponding tax rate for a buyer/seller transaction over a network, e.g., the Internet. The system may also be used to determine a tax authority and corresponding tax rate in a mobile telecommunications network, e.g., a cellular phone. The system includes a tax information system for determining the taxing authorities and corresponding tax rates by evaluating factors pertaining to the transaction such as, location, tax status, and transaction description. In addition, the tax information system may validate a payment modality, collect taxes, and account for the transaction.

23 Claims, 4 Drawing Sheets

U.S. PATENT DOCUMENTS

| | | |
|---|---|---|
| 6,016,479 A | 1/2000 | Taricani, Jr. |
| 6,025,774 A | 2/2000 | Forbes |
| 6,058,373 A * | 5/2000 | Blinn et al. .................... 705/26 |
| 6,064,983 A | 5/2000 | Koehler |
| 6,067,532 A | 5/2000 | Gebb |
| 6,078,898 A | 6/2000 | Davis et al. |
| 6,078,899 A | 6/2000 | Francisco et al. |
| 6,088,594 A | 7/2000 | Kingdon et al. |
| 6,101,483 A | 8/2000 | Petrovich et al. |
| 6,175,922 B1 | 1/2001 | Wang |
| 6,204,812 B1 | 3/2001 | Fattouche |
| 6,208,297 B1 | 3/2001 | Fattouche |
| 6,266,014 B1 | 7/2001 | Fattouche |
| 6,330,452 B1 | 12/2001 | Fattouche |
| 6,347,304 B1 * | 2/2002 | Taricani ....................... 705/19 |
| 6,460,020 B1 * | 10/2002 | Pool et al. .................... 705/26 |
| 6,587,835 B1 * | 7/2003 | Treyz et al. ................... 705/14 |
| 2003/0055754 A1 * | 3/2003 | Sullivan ....................... 705/31 |
| 2003/0093320 A1 * | 5/2003 | Sullivan ....................... 705/19 |
| 2003/0144931 A1 * | 7/2003 | Stokes et al. ................. 705/31 |
| 2004/0030619 A1 * | 2/2004 | Stokes et al. ................. 705/31 |
| 2004/0049437 A1 * | 3/2004 | Brikman et al. .............. 705/31 |

\* cited by examiner

TRANSACTION TAX SETTLEMENT IN PERSONAL COMMUNICATION DEVICES

CROSS REFERENCE TO RELATED APPLICATIONS

This application includes subject matter that is related to and claims priority from U.S. Provisional Patent Application Ser. No. 60/269,108, filed Feb. 15, 2001, which is hereby incorporated by reference.

FIELD OF INVENTION

The invention relates generally to facilitating transaction tax settlement in personal communication devices, and in particular, to a system and method for facilitating the determination of the taxable authorities, along with calculating and accounting transaction taxes for events associated with personal communication devices.

BACKGROUND OF THE INVENTION

The explosive popularity of the Internet combined with advances in digital and personal communications have contributed to an expanding, dynamic and viable commercial global market. Large investments in personal communications, and in particular to mobile telecommunications and devices, has provided consumers numerous means to conduct commercial transactions in a non-traditional way. Namely, personal communication devices, are beginning to supplement and replace traditional "cash and carry" or "credit and carry" commercial transactions by providing an electronic and often "on-line" means for conducting the same transaction.

As is often the case, technological advancements are released for public use before regulation can be enacted to govern the new developments and issues which surface. Commercial transactions occurring in a non-traditional sense, e.g., using personal communication devices, are no exception to this regulation back-log. One notable problem with the development of using personal communication devices to conduct commercial transactions, is the difficulty or inability to determine and collect transactional fees and/or taxes associated with the event. For instance, in the traditional sense of commercial transactions, applicable taxes are calculated based on a stationary location of the vendor and are collected from the purchaser at the time of the sale, typically during a face-to-face sales event. However, commercial transactions occurring via a personal computer or mobile computing device, are currently exempt from regulation controlling taxation due in part to extreme difficulty of tax settlement in a "virtual" environment.

Due to the increasing number of sales occurring in the non-traditional way and the tremendous loss of tax revenue due to, for example, Internet sales, it is believed that the tax-exempt status for such sales will soon cease or undergo changes. New regulation may soon be enacted which imposes taxes on Internet purchases of hard goods as well as "virtual goods" such as software and music from companies outside the taxing authority's jurisdiction. Companies selling to consumers within the jurisdiction of taxing authorities will desire a method to determine those taxes, even though the consumer may be in another city, state, province or country. Accordingly, a system and method to create a trusted, centralized directory that can provide the location or effective location of servers that provides the appropriate tax calculations is needed.

In a similar sense and until recently, mobile telecommunication service, e.g., cellular phone service, was a tax-exempt service due in part to the difficulty of determining taxes on a non-stationary event, e.g., mobile telephone call. However, the Mobile Telecommunications Sourcing Act of 2000 now enables State and local governments to tax mobile telecommunication device users for the service. The Act provides that all charges for mobile telecommunications services that are provided by the user's home service provider are subjected to tax, charge or fee by a taxing authority. The authority, however, can only be within the user's primary place of use, regardless of where the mobile telecommunication services originate, terminate, or pass through. In other words, the Act attempts to provide some form of tax collection, but due to the highly mobile nature of cellular phone use, only attaches tax to the user's primary place of use, i.e., a billing address. However, by virtue of the mobile use of the phone, many calls are placed outside the boundaries of the user's "primary place" and occur within another taxing jurisdiction. Yet taxes may only be collected by the taxing jurisdiction of the primary place and the State and/or local government where the call is actually taking place will not receive a taxable contribution.

It is believed that regulation will approach technology in the area of personal communication devices and legislation will be enacted to provide a means for collecting transactional fees and/or taxes for events occurring on the personal communication device. Accordingly, a system and method for determining the applicable taxable authorities, calculating the taxes, and accounting for the taxes in commercial transactions and personal communication occurring on a personal communication device is needed.

SUMMARY OF THE INVENTION

The invention provides systems and methods for transaction tax settlement in personal communication devices. In particular, the invention provides a transaction tax settlement system and method for determining a taxable authority and calculating a tax rate for a transaction.

The transaction tax settlement system includes a personal communication device configured to participate in a transaction, a tax information system, and a communication network providing two-way communication between the personal communication device and the tax information system. The tax information system includes a tax directory configured to facilitate identification of a tax authority capable of imposing a tax on the transaction, and a tax authority calculation configured to facilitate determination of a tax rate on the transaction.

In one embodiment of the invention, a transactional tax settlement system for use in a buyer/seller transaction over a network is provided. In particular, the system includes a personal communications device configured to initiate a purchase request from a seller via a network, a tax information system, and an electronic invoice representative of the purchase. The tax information system configured to receive a request from the seller. The request including transaction data for the tax information system to consider in facilitating identification of a taxing authority capable of imposing a tax on the purchase, and in facilitating calculation of a tax rate corresponding to the taxing authority.

In another embodiment of the invention, a transactional tax settlement system for use in a telecommunications network is provided. In particular, the system includes a mobile communication device configured to communicate over a wireless telecommunication network, a telecommunication service provider configured to facilitate a connection to the wireless telecommunication network, a tax information system, and a communication network providing two-way communication between the telecommunication service provider and the tax information system. The tax information system includes a tax directory configured to facilitate identification of a taxing authority capable of imposing a tax on the connection, and a tax authority calculation corresponding to the tax authority and configured to facilitate determination of a tax rate on the connection.

In yet another embodiment of the invention, a transactional tax settlement system for a peer-to-peer transaction is provided. In particular, the system includes first and second personal communication devices configured to participate in a peer-to-peer transaction, a tax information system, and a communication network providing two-way communication between one of said personal communication devices and the tax information system. The tax information system includes a tax directory configured to facilitate identification of a tax authority capable of imposing a tax on the transaction, and a tax authority calculation corresponding the tax authority and configured to facilitate determination of a tax rate on the transaction.

BRIEF DESCRIPTION OF THE DRAWINGS

These and other features, aspects and advantages of invention may be best understood by reference to the following description taken in conjunction with the accompanying drawings in which like numerals represent like elements.

DETAILED DESCRIPTION

Figure 1:
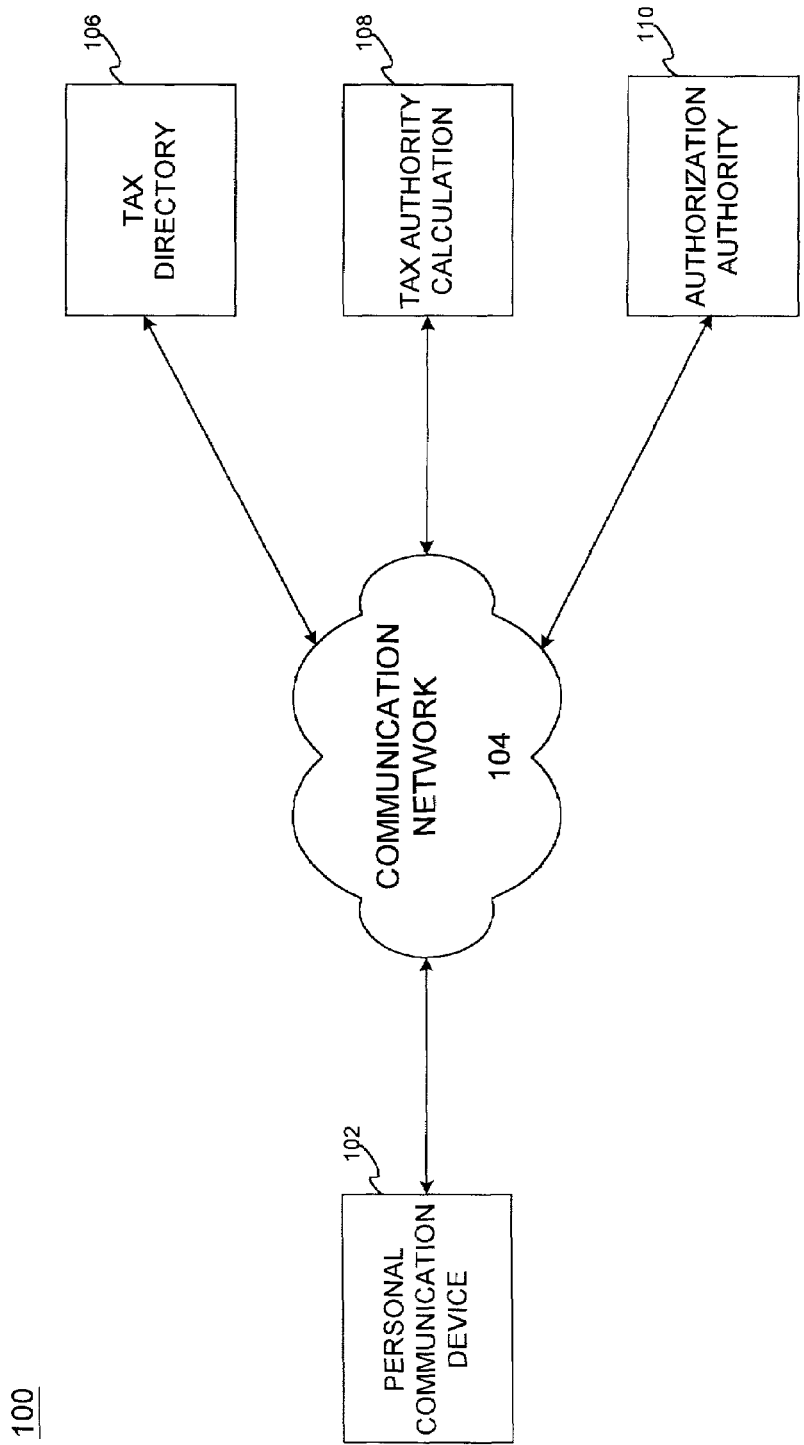
FIG. 1 illustrates, in block format, an exemplary transactional tax settlement system in accordance with the invention.

The invention may be described herein in terms of functional block components, screen shots, optional selections and various processing steps. It should be appreciated that such functional blocks may be realized by any number of hardware and/or software components configured to perform the specified functions.

For example, the invention may employ various integrated circuit components, e.g., memory elements, processing elements, logic elements, look-up tables, and the like, which may carry out a variety of functions under the control of one or more microprocessors or other control devices.

Similarly, the software elements of the invention may be implemented with any programming, scripting language or web service protocols such as C, C++, Java, COBOL, assembler, PERL, SOAP, XML, UDDI, OFX, or the like, with the various algorithms being implemented with any combination of data structures, objects, processes, routines or other programming elements. Further, it should be noted that the invention may employ any number of conventional techniques for data transmission, signaling, data processing, network control, and the like, e.g., TCP/IP, IPX, Appletalk, IP-v6, NetBIOS, OSI or any number of existing or future protocols.

The system may include a host server or other computing systems including a processor for processing digital data, a memory coupled to said processor for storing digital data, an input digitizer coupled to the processor for inputting digital data, an application program stored in said memory and accessible by said processor for directing processing of digital data by said processor, a display coupled to the processor and memory for displaying information derived from digital data processed by said processor and a plurality of databases, said databases including data that could be used in association with the invention. As those skilled in the art will appreciate, a personal computing or communication device may include an operating system (e.g., Windows NT, 95/98/2000, Linux, Solaris, etc.) as well as various conventional support software and drivers typically associated with computers.

Database may be any type of database, such as relational, hierarchical, object-oriented, and/or the like. Common database products that may be used to implement the databases include DB2 by IBM (White Plains, N.Y.), any of the database products available from Oracle Corporation (Redwood Shores, Calif.), Microsoft Access by Microsoft Corporation (Redmond, Wash.), or any other database product. Database may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

Exemplary system components are provided below to facilitate understanding of the invention and its best mode. It should be recognized that various other components may be used without departing from the spirit of the invention as intended. For the sake of brevity, conventional techniques for signal processing, data transmission, signaling and network control, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical network communications system.

The invention may be embodied as a method, a data processing system, a device for data processing, and/or a computer program product. Accordingly, the invention may take the form of an entirely software embodiment, an entirely hardware embodiment, or an embodiment combining aspects of both software and hardware. Furthermore, the invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The subject matter of the invention is particularly suited for facilitating the settlement of transaction tax and is conveniently described in that context. However, the invention has equal application to various other levies, such as any tax, charge, fee, fine, surcharge, appraisal or any other levy imposed by an authorized authority. In addition, the invention may equally apply to determining, calculating and accounting for subsidies, rewards and the like, imposed by an authority.

In general, the invention provides a system and method for facilitating transaction tax settlement in personal communication devices and, in particular to a system and method for determining the taxable authorities, along with calculating and accounting transaction taxes for events occurring in association with a personal communication device. Various types of personal communication devices may be used to connect to one or more communication networks. For example, the Internet is one such network which is readily accessible by a wide variety of personal devices and thus, the following examples will often be described in this context. The system includes one or more taxing databases in communication with the personal device to provide applicable tax and/or fee information. Such information may include the taxing authorities applicable to the particular event, and a calculation or formula for determining the applicable taxes/fees. The system may further include a location determining apparatus to facilitate the request for applicable taxing authorities based on, for example, the location of the event. Additionally, the system may include an optional authorization authority providing payment authorization to a seller, telecommunication service provider, or the like. Thus, as will become apparent from the following descriptions, the system and methods of the invention may be used to determine, calculate and/or account for taxes, fees, charges and other levies, due in a wide variety of applications.

FIG. 1 illustrates, in block format, an exemplary transaction tax settlement system 100 of the invention. System 100 includes one or more personal communication devices 102, a communication network 104, and a tax information system which includes a tax directory 106, a tax authority calculation 108, and an optional authorization authority 110. Used herein, "personal communication device" may include any communication device, portable or stationary, wireless or wired, preferably capable of two-way communication. Examples of suitable personal communication devices include, but not limited to, a cellular phone, laptop or portable computer, personal digital assistant ("PDA"), stationary personal computer, messaging device, handheld computer (e.g., Palm Pilot®), on-premise wireless gateway system, electronic wristwatch device, electronic wallet, and various other communication devices.

Communication network 104 may include one or more networks communicating via wireless or wired protocols. For example, in one particular embodiment, personal communication device 102 may include a wireless remote device which typically connects to a wireless cellular network. The wireless remote device may also connect to the Internet. In this manner, communication network 104 may include multiple networks capable of two-way communication between the networks. In this particular embodiment, as well as others, personal communication device 102 may include a web-compliant personal communication device suitably capable of processing web pages and multimedia information (i.e., text, graphics, video and/or audio), and may include a remote multimedia device or personal computer having web-client software, an audio processor, a visual display, and/or an audio transducers. Web-compliant personal communication device 102 may be of a type capable of establishing a packet communication link via the Internet using a common protocol, e.g., Hyper-Text Transfer Protocol (HTTP), the operation of which is beyond the scope of this invention and will not be described in detail.

Communication network 104 may include any suitable transmission network as may be needed for a particular application of the invention. For example, network 104 may include, but not limited to, any known or discovered system for exchanging data or transacting business, such as a telephone network (land or wireless), Internet, intranet, extranet, WAN, LAN, satellite communications and/or the like. It should be appreciated that, although not shown or described, additional connections, links and/or adapter interfaces may occur between personal communication device 102 and network 104 such as connection to a wireless base station, web translation server, IP router, and/or a coordinator system to drive IP routing within the system.

Tax directory 106 may be implemented as a database located on a server within the system. In general, a request for tax information is sent to tax directory 106 from either a personal communication device 102 via the network 104 or from the seller (this embodiment will discussed below) via the network 104. Suitable programming within the system, and specifically within tax directory 106, reviews the request to determine whether any existing taxing authorities can impose a levy on the particular event or transaction. The request may provide pertinent information which the tax directory can consider in deciding which tax authorities, if any, may pertain to the transaction. This function will be discussed in greater detail below.

In one embodiment, tax directory 106 return the location information (e.g., network addresses) to personal communication device 102 or requester of each taxing authority eligible to receive a levy from the transaction. Depending upon the particular application of the invention, tax directory 106 may provide location information of applicable taxing authorities based on one or more of the city, state, country, and multi-national of a buyer and/or a seller, location information of special taxing authority government levels for specific transaction goods, such as food, hotels, etc., and trusted delivery of tax tables (e.g., a server or web site could be used to download tax tables).

Tax authority calculator 108 may be implemented as a database located on a server within the system, and may be locally owned by a service or located on a network, such as the Internet. It should be realized that a plurality of tax authority calculator 108 systems may exist with each one corresponding to a taxing authority. Alternatively, multiple taxing authorities may coexist on a single server. In general, a request is made to each tax authority calculator 108 for tax information via the network 104. The request may contain pertinent information for tax authority calculator 108 to use in determining the applicable levy due. For example, the information may include, but not limited to, the spatial location of the transaction, quantity ordered, service or merchandise type, or seller and purchaser identification codes. In one particular embodiment, for each request sent to an appropriate tax authority calculator 108, a response consisting of the applicable tax rate as well as payment modality will be returned, e.g., to personal communication device 102 or the requester. Used herein, "payment modality" refers to the type, form or kind of payment, e.g., electronic cash wallet, credit card, debit card, etc, or the protocol, conditions and category of the payment, e.g., electronic payment, c.o.d., bank check, etc. The response returned to the personal communication device or seller may contain one or more of an IP address of each lax authority calculator (e.g., tax authority calculator 108), DNS name of each tax authority calculation, Universal Resource Identifier to be used at tax authority calculation, message identifier of the request to be made, list of fields to be sent, and version of the message will be returned, e.g., to personal communication device 102. Recognizing that different tax authorities may provide the service on a unified or consolidated basis, a single composite tax rate may be returned for a single transaction request that represents a total tax due for the transaction. form or kind of payment, e.g., electronic cash wallet, credit card, debit card, etc, or the protocol, conditions and category of the payment, e.g., electronic payment, c.o.d., bank check, etc. The response returned to the personal communication device or seller may contain one or more of an IP address of each tax authority calculation (e.g., tax authority calculation 108), DNS name of each tax authority calculation, Universal Resource Identifier (URI; reference www.w3c.org) to be used at tax authority calculation, message identifier of the request to be made, list of fields to be sent, and version of the message. will be returned, e.g., to personal communication device 102. Recognizing that different tax authorities may provide the service on a unified or consolidated basis, a single composite tax rate may be returned for a single transaction request that represents a total tax due for the transaction.

In one particular embodiment, recognizing that some tax rates are relatively static and may not regularly change or only a few times a year per location, the system may utilize universally coordinated time stamps provided by a location signal, such as a GPS signal or confirming the date and time is valid on a sellers server. The timestamps are compared with a similarly maintained timestamp by tax authority calculation 108 indicating the last changed timestamp for the date and time of tax changes. This may help to minimize the network protocol overhead by allowing the last set of frequently used tax rates to be cached on personal communication device 102 or seller's web site.

In yet another embodiment, tax authority calculation 108 may return either one or more calculated tax amounts, or one or more rules for calculating the taxes. The rules may be especially useful when the taxation of the location, good, etc. does not change from sale to sale. The rules, tax rate tables., or the like, may be stored on personal communication device 102 or on a local database.

In still another embodiment, tax authority calculation 108 may return either one or more calculated subsidiary amounts, or one or more rules for calculating the amounts. This embodiment permits taxing authorities or other authorized authorities to subsidize certain purchases and usages within their jurisdiction. For example, in a mobile telephone application, which will be discussed in detail below, taxes and/or service fees imposed for use of a telecommunications network may be subsidized, for example, for certain classes of users, calls (e.g., emergency use), or within certain boundary limits.

In one particular embodiment, the location information provided by tax directory 106 includes a specific implementation for the Internet such as use of a high-level domain name qualifier, e.g., ".tax". For example, tax directory 106 may be located as www.taxdirectory.tax. This domain may be owned and operated by a single entity (e.g., Directory Service Manager ("DSM")) which could control updates to domain name service (DNS) updates. The DMS may only allow legitimate taxing authorities to be present in the .tax domain by verifying the legitimacy of the requesting taxing authority before adding or changing their records in the .tax domain. In this manner, the tax authority calculation 108 can be trusted. The trust level of tax directory 106, when implemented as a DNS, can be improved by use of Secure DNS as defined by the Internet Engineering Task Force (IETF). A trusted tax authority calculation service, once verified, may be provided an interface to the .tax DNS to make modifications to the records without repeated verification. The DNS may also have a standard address format, so that the form of the trusted tax authority calculation service can be independently arrived at by logical extrapolation. For example, a trusted tax authority for a U.S. city may be, www.ci.peoria.il.us.tax, where "ci" indicates a city, "peoria" indicates the name of the city, "ii" indicates the regional abbreviation, "us" indicates a standard country abbreviation, and finally "tax" indicates the domain.

In another embodiment, tax directory 106 may include a service that proxies for tax authority calculation 108. Instead of, or in conjunction with, sending back an address to personal communication device 102 or seller, tax directory 106 queries the tax authority calculation 108 directly and just passes the calculation result or method back to device 102 or seller. In this particular embodiment, a .tax domain may not be needed because tax directory service 106 would be a known and trusted service.

In yet another embodiment, tax directory 106 may locally store tax information which is used often or that does not change often, to provide the tax calculation result or method directly to the personal communication device 102 or seller. This reduces network overhead and may increase efficiency.

In one particular embodiment, system 100 includes authorization authority 110 which may be implemented as a database located on a server within the system. In general, authorization authority 110 provides an approval for the funds or payment modality to be levied as a result of the transaction. For example, a seller in a goods transaction may submit a credit card number and dollar amount to authorization authority 110 for approval of the transaction. Typically, authorization authority 110 receives the request, verifies the request, and returns a response (e.g., approved or denied) to the requester.

In yet another particular embodiment, tax directory 106 includes tax calculation and approval from authorization authority 110 which may be implemented as a database located on a server within the system. This provides the seller or personal communication device 102 with a single request to tax directory 106, which in turn returns the applicable taxes and authorization approval for the full amount. For example, a seller in a goods transaction may submit a credit card number and dollar amount to tax directory 106 for tax calculations and approval of the transaction. Typically, authorization authority 110 receives the request, verifies the request, and returns a response (e.g., approved or denied) to the requester.

In still another embodiment, tax directory 106 may obtain an approval, or the like, from authorization authority 110 for taxes on behalf of the taxing authority calculated by tax authority calculation 108. Taxes may be determined, calculated, authorized, and collected on behalf of multiple entities and remitted to the each individual entity. In this manner, the taxing authority may receive taxes directly from tax directory 106, while other entities receive tax payments from the seller or telecom service provider. Tax directory 106 may collect payment for the authorized amount and remit the collected taxes individually or in aggregate to the taxing authority on a scheduled or unscheduled basis.

Purchase Over a Network Appication

In one particular embodiment and application of the invention, the system and methods of the invention are used to determine, calculate, and account for taxation of purchases over a network, e.g., an open network like the Internet. With continued reference to FIG. 1 (in combination with the following flowchart 200), system 100 will be described in detail for use in a network purchasing application. In this embodiment, system 100 is particularly useful in an Internet or web-based environment in which taxes may be collected for purchases made over the Internet, thus communication network 104 may be conveniently described in that context.

In a buyer/seller transaction, there is typically both a buyer and a seller. As previously mentioned, personal communication device 102 may include one or more devices, even though not depicted on the present Figure. Thus, it should be assumed that in this embodiment, a personal communication device 102 exists for the buyer and a either a personal communication device, a web site, or other means for supplying a sale service exists for the seller.

Purchase Over a Network Appication Flowchart

Figure 2:
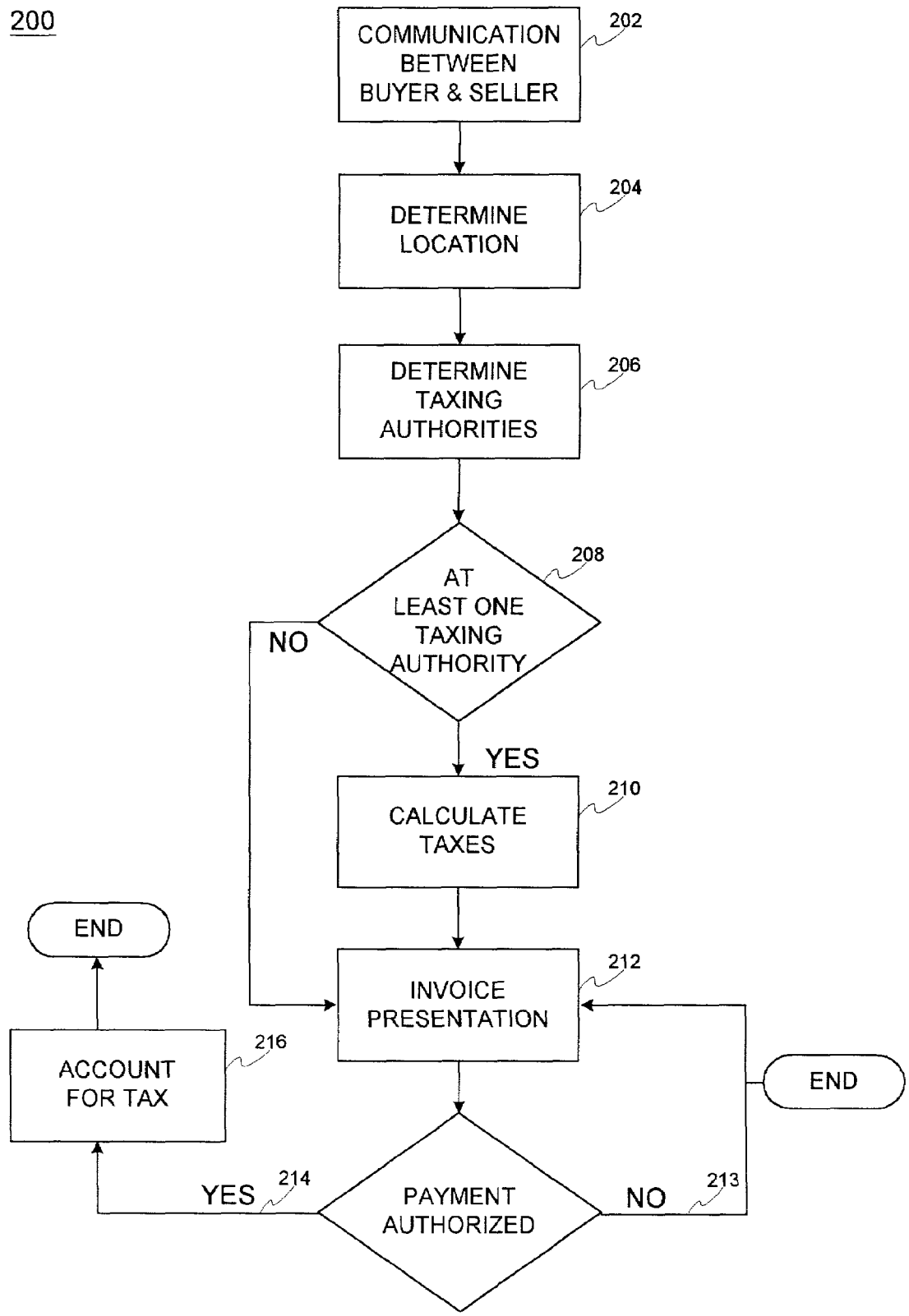
FIG. 2 is an exemplary flowchart of a transactional tax settlement system having particular use in a network purchase environment.

FIG. 2 is a flowchart 200 describing an exemplary embodiment for transaction tax settlement in a network purchase environment. For ease of understanding, flowchart 200 is conveniently illustrated and described in connection with the Internet, however it should be appreciated that various other networks are suitably applicable.

In general, the buyer initiates a purchase request from the seller (step 202). Depending on the particular environment of the buyer and the seller, the request may be in the form of a purchase order on a seller's web site from the buyer's personal communication device 102.

In a conventional sales transaction, the location of the sale is often a key factor in determining the applicable tax authority and tax. It is believed that transaction tax due on purchases or sales transactions via a network may also consider the location in determining the taxing authorities and tax. In this manner, taxes may be incurred based on the location of the buyer requesting the purchase (or the individual's personal communication device), the location of the seller receiving the purchase request or fulfilling the purchase request, the location of the point of presence providing access to the network (e.g., ISP or telecom service), the "doing business" location of either party in communication, the billing address of the buyer, shipping address of the buyer or the seller, or any combination thereof.

The location(s) may be determined (step 204) by providing location data to the tax information system. The location data may include data from the personal communication device (e.g., stored thereon or presented by the user at the time of transaction), data from a seller's point of presence, or data from a participating third party. Location data may also be obtained from a communications service. For example, suitable communication services may include, but not limited to, device based solutions, such as, a GPS satellite system signal, Network Assisted GPS (A-GPS), or Enhanced Observed Time Difference (E-OTD) methods, and network based solutions, such as Cell Global Identity Timing Advance (CGI-TA) and Uplink Time of Arrival (TOA). The details of determining the location using the above techniques is beyond the scope of this invention and thus will not be described in detail.

The seller may then request a determination of the applicable taxing authorities from a tax directory, e.g., tax directory 106 (step 206). The request may include pertinent information relating to the transaction which tax directory 106 may use to determine the taxing authorities. For example, the request may include any or all of the location information as previously described, the date and time of the transaction, the category of good being purchased, the sales prices, and the tax status of the parties involved. To facilitate the calculation of taxes for a plurality of transactions, this request can include identification information, which provides a method of determining the tax status of the individual purchaser from information stored on tax directory 106, personal communication device 102, seller, or an independent third party such as Microsoft® passport. Such identification information could include, for example, whether the purchaser was tax exempt for some transactions based on personal characteristics such as being a member of a clergy, a certain age, nationality, or being a member of a protected class (e.g., Native American tribe). This identification information may affect the calculation of a tax for a specific transaction. Some elements of this information may be implicitly defined, such as all users of a cellular phone plan being taxed for service at the same rate. Other elements of information, being explicitly defined and stored as part of tax directory 106, personal communication device 102, seller, or an independent third party, would apply to individual purchasers, whether they are acting as individuals or agents for a corporate entity making a purchase. If at least one taxable authority is identified (step 208), then the location(s) of the authorities are returned to the seller. If, however, no taxable authorities are identified, then the buyer may be presented with an invoice (step 212), a process which will be discussed in detail below.

In one embodiment, the location of the identified tax authorities is returned to the seller. The location may include, for example, an IP address of each tax authority, DNS name of each tax authority, URI to be used at tax authority calculation 108, message identifier of the request to be made, list of fields to be sent to tax authority calculation 108, and the version of the message. In one particular embodiment, tax directory 106 may include a specific implementation suitable for the Internet such as use of a high-level domain name qualifier such as ".tax". In this manner, a tax rate associated for a location based on, for example, postal zip codes, such as "85254-6419", would be associated with an address, e.g., "852546419.tax." Tax directory 106 may then return tax information applicable to the tax rates associated with such a location. Other embodiments may include access paths based on the GPS location such as latitude-longitude-altitude, for example, "75-05-29-12N-82-57-10-19W.tax", might represent 75 degrees, 5 minutes, 29.12 seconds north latitude, 82 degrees, 57 minutes, 10.19 seconds west longitude.

The seller then requests a calculation of the applicable taxes from a tax authority calculation, e.g., tax authority calculation 108 (step 210). This request may contain information presented to the seller in the tax directory response, the parties locations, date, time, category of goods, sales price, quantity ordered, or any other pertinent tax or sales information used to calculate the applicable tax. In one particular embodiment, the seller receives the calculated tax, however, the seller may also receive rules for calculating the tax, payment modality, and any other information as previously discussed.

The buyer may then be presented with an electronic invoice of the proposed transaction (step 212) on personal communication device 102. The electronic invoice may contain a detailed itemization of the transaction including charges for goods and services, taxes, and optional items such as a tip. The buyer then selects an appropriate payment modality and initiates completion of the sales transaction.

Personal communication device 102 sends a client server request to the seller's device. The tax payment modality allows for flexibility on the part of the taxing authority to specify any variable options that the buyer might want to select. The buyer can exclude certain items based on intent to resell, the location of another delivery address, or special treatment based on location specific tax laws.

The seller receives the completed order and may then request authorization for payment from, for example, authorization authority 110. The authorization may include an acceptance or denial of the payment amount, payment modality, etc., depending upon the parties credit or credit arrangements. If the payment is denied or otherwise not accepted (step 213), the seller may re-present the invoice and the buyer may modify the order. Alternatively, the process may end. If, however, the payment was authorized (step 214), the seller may complete the sale.

Finally, the process may include an accounting procedure to, for example, either bill the seller or the buyer and/or collect the funds (step 216). This accounting may occur at the seller's location or as previously discussed, may occur at tax directory 106.

Mobile Telephone Application

Figure 3:
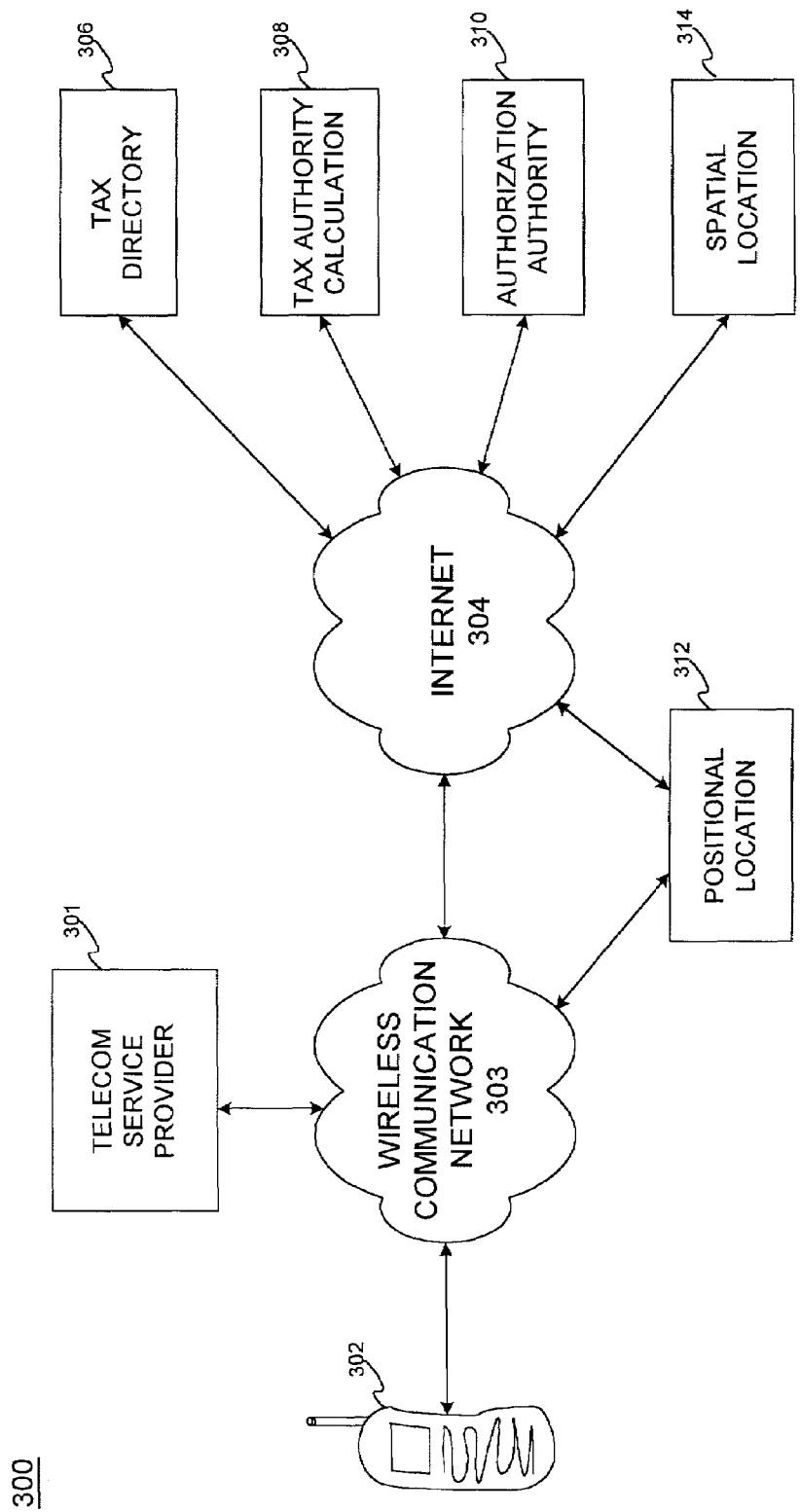
FIG. 3 illustrates, in block format, an exemplary transactional tax settlement system, in accordance with the invention, having particular use in a mobile telecommunication application.

In another particular embodiment and application of the invention, the system and methods of the invention are used to determine, calculate, and account for any usage of a telecommunications network, e.g., a cellular phone use. FIG. 3 illustrates, in block format, an exemplary transaction tax settlement system 300 of the invention. System 300 is particularly useful in a mobile telephone application in which taxes and/or service fees may be collected for use of a telecommunications network. System 300 includes a telecommunication ("telecom") service provider 301; a personal communication device 302; a communication network 303 and 304; a tax information system having a tax directory 306, a tax authority calculation 308, and an optional authorization authority 310; a positional location 312; and a spatial location 314. Telecom service provider 301 may include a local telephone company, a cellular communication provider or any similar telephone service provider. In general, telecom service provider 301 represents the local communication provider for the physical location of personal communication device 302.

Personal communication device 302 may be of any type previously described for device 102 having two-way audio/voice capabilities. For example, personal communication device 302 may be a mobile communication device, such as a cellular phone. As such, the following description will be conveniently described with reference to a cellular phone, however this is not intended to limit the scope in any way.

In this particular embodiment, communication network 303 and 304 include a wireless communication network and the Internet, respectively. Wireless communication network 303 provides connection service for wireless devices, such as cellular phone 302. Wireless communication network 303 also provides connection to telecom service provider 301. Internet 304 provides the network connectivity between the system's taxation information and cellular phone 302 and/or telecom service provider 301.

The tax information system having tax directory 306, tax authority calculation 308, and authorization authority 310 are similar to previously described tax information system of system 100, thus these elements will not be repeated.

Positional location 312 and spatial location 314 provide the location of cellular phone 302. For example, positional location 312 may provide the physical location of cellular phone 302 and spatial location 314 may provide the geopolitical location of cellular phone 302. Used herein, "geopolitical location" is the geographic boundaries that relates to political factors, and it should be appreciated that the boundaries may overlap. A GPS (global positioning system) or GPS-like system may be used alone or in combination with cellular phone towers to determine the position of the originating call. Taxes or service fees may be incurred based on a variety of factors, such as the location of the cellular phone placing the call, the location of the service provider providing the point of presence, and the "doing business" location of the parties in communication, or any combination thereof.

In one embodiment, system 300 may be useful in a Voice over Internet (VOIP) protocol or other similar Internet protocols. In this particular application, an Internet Service Provider (ISP) may provide service in a similar manner as telecom service provider 301. The ISP may make similar requests to determine the applicable taxing authorities, calculation of tax, payment authorization, and so forth, as previously described for telecom service provider 301. As previously mentioned, the tax is often determined based on the location of the user, event, or any number of factors. For this embodiment, the request to tax directory 306 may include, for example, the location of the ISP initiating the connection, the ISP receiving the connection, the protocol being used (e.g., VOIP), the location of the users, or any combination of the above. The tax may be different depending on the service or protocol being provided by the ISP and used by the customer. That is, VOIP may be taxed at telecom rates, Internet Relay Chat (IRC) at a different rate, and HTTP may be tax-free.

Mobile Telephone Application Flowchart

Figure 4:
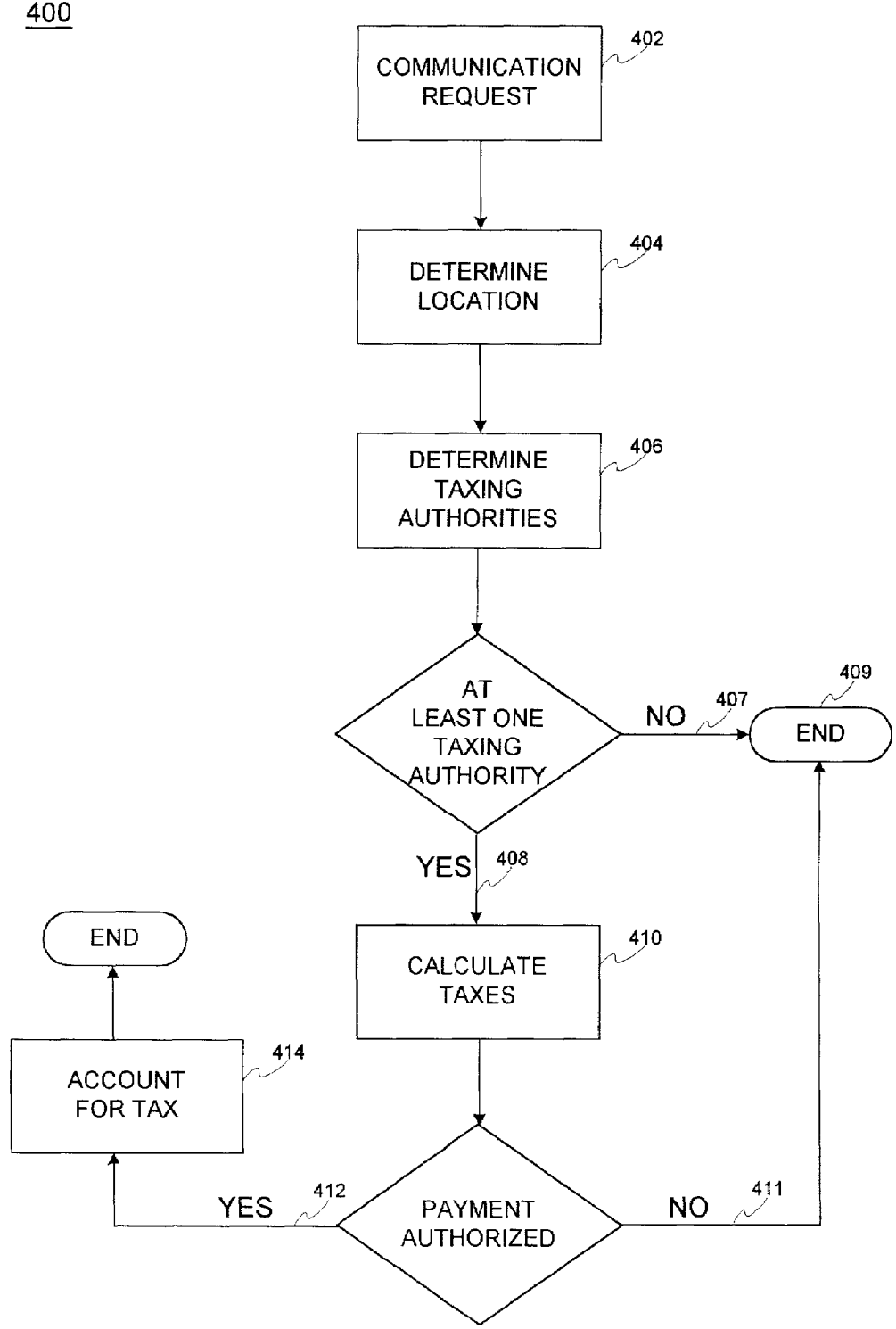
FIG. 4 is an exemplary flowchart of the application of FIG. 3.

FIG. 4 is a flowchart 400 describing an exemplary embodiment for transaction tax settlement for a mobile telephone application in accordance with the invention. For ease of understanding, flowchart 400 is conveniently illustrated and described in connection with a cellular phone. Therefore, reference is made herein to cellular modules, routines, and the like.

The transaction tax settlement process for a mobile telephone application generally begins with the cellular phone user placing a call on a cellular communication device via the wireless communication network. For this example, it is assumed that the user is outside of the user's primary service provider's boundaries and is requesting communication from a local telecom service provider (step 402). If the communication request is permitted by the local telecom service provider, then the provider begins the process of determining, calculating and accounting for any taxes due.

As previously mentioned, taxes may be incurred depending on one or more locations. For this example, it is assumed that the pertinent location is of the originating call or cellular phone device. The telecom service provider may issue a request via a wireless network or wired network to determine the location of the cellular phone device (step 404). The location may be internally calculated by the device and transmitted to the service provider or obtained from a location service provider. For example, a GPS satellite may in communication with the telecom service provider and the cellular phone and transmit position information corresponding to the cellular phone directly to the telecom service provider. Of course other means of determining the position of the cellular phone are equally applicable and may be suitably implemented. The telecom service provider may further request the geopolitical location of the cellular phone from, for example, a spatial location service (step 404).

Once the location information is determined, the telecom service provider may then request a determination of the applicable taxing authorities (step 406) relative to the location information. The request may include various information used by a tax directory (e.g., tax directory 106) to determine the tax authorities. For example, the request may include one or more of the cellular phone location, telecom service provider location, cellular phone call recipient location, date and time of call, length of call. It should be noted that steps included in flowchart 300 may be performed before or after a call has been placed.

If the tax directory determines that at least one taxing authority has jurisdiction over the communication, then the location of each tax authority is returned to the telecom service provider (step 408). If, however, no tax authorities have jurisdiction (step 407), then the process may end (step 409). The location message received by the telecom service provider may contain one or more of an IP address of each tax authority calculation (e.g., tax authority calculation 108), DNS name of each tax authority calculation, URI to be used at tax authority calculation, message identifier of the request to be made, list of fields to be sent, and version of the message.

The telecom service provider may then transmit a request to each of the identified tax authorities to provide a calculation of the applicable tax due (step 410).

A tax authority calculation may receive pertinent information, as previously described, to determine the amount of tax due. If all the tax authority calculations determine that no tax is due, then the process may end. If, however, a tax is due, then the amount of the calculated tax is transmitted back to the telecom service provider.

The telecom service provider may then request a payment authorization from an authorization authority (e.g., authorization authority 110). This may be a billing service provider or the like. If the payment (or billing) is authorized (step 412), then an accounting may take place, otherwise the process may end (step 411). Finally, to account for the tax (step 414), the amount may be processed on a monthly billing statement provided by the local telecom service provider, or alternatively, the local provider may bill the user's primary service provider. The amount may also be collected by the user at the time of the call or stored on the user's device for later payment. It should be realized that many of the steps, such as those provided herein, may be performed at a later time, for example during a monthly billing cycle, such as calculation of the tax, authorization of the payment, and payment of the tax. It should also be realized that functions can be combined in one server, for example the tax directory may also directly provide either or both the tax authority calculation or authorizations as one or more transaction messages with the telecom service provider.

Purchase Using a Mobile Telephone

In still another particular embodiment and application of the invention, the system and method of the invention are used to determine, calculate, and account for any taxation for purchases using a mobile telephone over a telecommunications network. This particular embodiment is similar in structure to system 300 and thus reference to FIGS. 3 and 4 will be conveniently made. Additionally, this embodiment includes some of the processes described in both the previous examples (purchases and mobile telephone use) therefore, some of the steps may not be repeated herein, but should be understood and referenced to the previous examples.

In general, a buyer using a personal communication device, such as cellular phone 302, a PDA, or any other device as previously mentioned, may request communication over a local telecommunication network (this generally occurs by placing a call). The buyer may be requesting to purchase a good or service which is unique to the telecom industry, such as prepaid phone minutes. The seller or telecom service provider may contact tax directory 306, in the manner as previously described, request the applicable taxing authorities. The request may include the pertinent information to both the sale and the use of the telecommunications network. Recognizing that this is a purchase of telecommunication service, tax directory 306 may indicate that there is no tax or indicate a different tax then is normally returned for placing a call on the network. Tax directory 306 may also return the addresses of relevant tax authority calculations for the actual purchase of the service (e.g., prepaid phone minutes).

The telecom user or buyer in this example may still receive bills for the communication tax and/or an invoice for the purchase.

Peer-To-Peer Application

In still yet another particular embodiment and application of the invention, the system and methods of the invention are used to determine, calculate, and account for any taxation between two or more individuals in a peer-to-peer relationship (i.e., personal communication device-to-personal communication device). This embodiment is particularly useful in a peer-to-peer application in which taxes may be charged for a particular transaction. The system and process of this embodiment are similar in nature to system 100, except that there would be at least two personal communication devices 102 in communication with each other. Additionally, third-party systems in communication with one or both of the personal communication devices may be included to facilitate transactions.

In general, wireless services are used to exchange messages between personal communication devices. The messages may include transfer of funds and sale of goods and services. In this manner, one device may be considered the donor (e.g., transfers money, goods, services) and one device the recipient (e.g., receives the transfer). One of the personal communication devices or a third-party may initiate the request to tax directory 106 for determination of any taxable authorities. For example, a taxing authority may levy a fee in a peer-to-peer sharing by individuals of music or other multi-media files similar to the fees collected by the Recording Industry Association of America (RIAA) when recording media is sold.

Various other taxes may be imposed as previously mentioned, for example based on the location of the parties, goods sold, sales price, etc. Tax authority determination, calculation and payment authorization may be performed in a similar manner as previously described with information being sent to either one of the personal communication devices or a third party. The payment could be in the form of a portion of a pre-paid service, such as a card with a personal identification number, currently used for example as pre-paid cellular telephone access cards. Other payment forms may be by third-party systems, such as PayPal™, transferring of funds directly to consumer credit card accounts, and transferring funds between credit cards. For a description of the latter, refer to U.S. patent application Ser. No. 09/704,379, filed Nov. 2, 2000 and entitled, "System and Method for Facilitating Commercial Transactions Between Parties Residing at Remote Locations."

In the case of third-party systems, the third party may query the location of both devices and request the tax information from the tax directory and tax authority calculation on behalf of the transacting parties. Third-party systems often provide a secure environment for the transfer of funds or payments.

Various Applications of the Invention

As is readily apparent from the preceding description, various other embodiments and applications of the systems and methods of the invention are possible. For instance, the following examples provide brief descriptions of various applications that may benefit from the invention and are not intended to limit the scope of the invention, but provided merely to demonstrate the versatility of the invention.

EXAMPLE 1

Ad-Valorum Taxes

Ad-valorum taxes based on the value of a sales transaction could also be calculated, based on the jurisdiction of the taxing authorities as previously described. In this example, the amount of tax is again based on the jurisdictions where the mobile device is located.

EXAMPLE 2

Customs Duties or Taxes

The invention may also be used to determine customs duties or taxes for shipments arriving in a location using various methods of transport. For example, a material such as lumber may be taxed at different ports of entry at different rates. A personal communication device located at each port of entry could use the location criteria to supply the tax calculation services with the data as a parameter to the calculation. For purposes of efficiency in the collection of taxes, the embodiment in this form, could include very small implementations of wireless devices embedded in products which would self-identify themselves based on a received command, for purposes of tracking the shipment through a customs house. Similar fees might include taxes collected for way station inspections for fruit or cargo carried by a transportation vehicle.

EXAMPLE 3

Transit or Transportation Taxes

The invention may also calculate taxes based for transit or transportation. For example, a passage on a ferryboat or a toll across a bridge, might be automatically calculated based on the location of a vehicle in which a mobile commerce electronic device was positioned. The direction of movement, such as tolls on north bound traffic only on a bridge, or tolls associated with a direction of a ferry's passage might be calculated based on direction or movement. Another use in a transportation scenario might occur in areas where public transit fees are collected in zone systems. For example, a subway system may associate different fees by zones of travel, such as the distance of rings around a core. A personal communication device, might calculate a tax based on the location of movement within these zones or rings of distance.

EXAMPLE 4

Transactions Between an Individual and a Fixed Location Device

This embodiment is between a personal communication device and a fixed location device such as a vending machine. In this instance, the vending machine would supply a location or a tax amount which is used to determine the tax rate.

EXAMPLE 5

Purchase of Confidential Property Over a Wireless Network

A tax could also be calculated based on the protection of intellectually protected property, such as music in the form of MP3 files, which are delivered over a wireless network to a mobile device. The location of the device could determine which entity receives payment for the material as well as any taxes associated with the delivery of the intellectually protected property.

EXAMPLE 6

Access to Controlled Facilities

Another embodiment of the invention, involves the use of calculation of a tax based on access to a controlled facility such as a sports venue or entertainment event. For an example of a ticket system, see U.S. Pat. No. 6,067,532, which is incorporated by reference. In this example, the location of access, such as a special portal or gate, or the location of the participant in the venue may determine the tax rate. A sports or entertainment venue might sell tickets or access passes in the form of electronic messages which are transmitted to the wireless device. The value of the tickets would then be taxed at either the time of purchase or the location or time of use. For example, an electronic ticket for a movie theater could be purchased over the Internet for access to an entire movie theatre chain. Use of the pass at a movie theater in New York could be taxed at a different rate then a theater in Nebraska. Another example, could include taxes for rides or amusements within a large scale entertainment venue, which incorporates different locations with a larger community. For example, a venue so large a ride could be located miles from another ride owned or operated as one commercial enterprise, thus selling a common book of tickets. For example, an electronic ticket which allows entrance to a zoo, or a Ferris wheel within a large geographic area. This may also include a tax on location based entertainment services, such as interactive devices which wirelessly communicate with the entertainment venue, based on proximity of location. For example, a tax could be calculated based on delivery of information or reservations made with a restaurant within a two block area. A tax could also be calculated with a mobile commerce wireless device which interacts with an entertainment attraction such as a device which controls an animated statue based on the proximity of location to the mobile commerce electronic device.

EXAMPLE 7

Subscription Services which Occur at Multiple Locations

Another embodiment of the invention involves the delivery of subscription or temporally periodic services which may occur in different locations based on the point of delivery of the subscriber at any specific instance of the service or products. An example of this embodiment could include a fee which was collected by a tax entity based on monthly use within a location. For example, the State of California could require a tax be paid based on the actual number of miles driven by a commercial vehicle, which would be reported on a periodic basis to the taxing authority. In this case, the vehicle may not physically be located in the taxing authority for the entire period or at the time the report is made, but the mobile commerce electronic device would record entry and egress into various taxing authorities and record them periodically.

EXAMPLE 8

Services Based on Direction of Physical Movement

An embodiment of the invention which relies on directional movement between two points which bases the tax calculation based on the direction of movement could also be calculated. For example, a network of toll roads or bridges could calculate the value of the tax based on the direction of travel. Highly congested directions such as traffic onto an island, might be taxed at a higher rate than traffic away from an island.

EXAMPLE 9

Services Based on Time of Day and Location

Because of technological improvement, tax authorities may tax events based on time of day and location. A wireless device capable of providing the time of day as well as location, may tax limited services at different rates according to demand. The seller or telecom service provider will also be able to the determine the time of a transaction for usage in calculating taxes.

EXAMPLE 10

Services Based on Altitude and Location

An embodiment which incorporates altitude information from the GPS system could also be used to tax airborne services at different rates. For example, telephone calls from aircraft could be taxed at a different rate based on the cost of providing infrastructure for such calls. This could include different rates for electronic communication services made within aircraft while on the ground within an airport facility.

EXAMPLE 11

Services Broadcast to Mobile Devices Based on Location

Broadcasting to mobile commerce wireless devices could also be embodied by taxes based on services, such as taxes on advertisements delivered to such devices. Wireless broadcasting, based on location, which may include games, advertising, or location specific services may be subject to tax based on location and content. For example, differentiated services, such as multilingual interpretative material could be broadcast at a historic location to a mobile commerce electronic device. Such as device could calculate a tax based on the number of advertisements displayed or played.

EXAMPLE 12

Services Using Cryptographic Schemes Based on Location

A tax might also be calculated based on a cryptographic scheme which includes location information. For example, a cryptographically encoded signal code be broadcast at a specific location which can only be decrypted using the location and time of day as part of the cryptographic keys. Such as service could include a taxable component which could vary by location of delivery of the service. For example, a satellite could transmit radio content to drivers in vehicles over a large geographic area. The content of the satellite signal could include advertising which would be decrypted based on location and time.

EXAMPLE 13

Self Identifying Products Using Wireless Communications

Inventory management applications which incorporate a tax for storage, transportation or sale. Articles of commerce such as packaged goods for sale are equipped with mobile commerce electronic devices which provide self-identification. In this mode, a transponder broadcasts a signal requesting an identification reply. The identification reply is then sent to a tax calculation process as previously described, and a tax is levied on the movement, storage, transportation or sale of the article of commerce.

EXAMPLE 14

Gaming or Lotteries

This example is particularly useful where the wagering locations are physically separated from the gaming or lottery locations. Personal communication devices could also use location based services for the calculation of taxes involved in gaming or lottery events, where the location of the device determines the appropriate taxable entities. In this example, a mobile commerce electronic device may use the location calculated by satellite, radio triangulation, or fixed device reporting to determine whether a gaming or lottery transaction is legally available under the laws of the appropriate jurisdiction in which the device is located. If wager is successful, a tax can be made on the winnings based on the location of the device and the type of wager made.

EXAMPLE 15

Taxes Based on the Physical Movement of Goods or Articles

Taxes based on the physical movement of goods can be made extremely efficient using mobile commerce electronic devices. For example, sales taxes based on delivery of parcels could be assessed and collected if done at the time of pickup or delivery by a package service.

EXAMPLE 16

Parking Taxes or Fees

A further embodiment would be using a personal communication device as a mechanism for paying fees for services such as parking based on location, access direction or group identification. For example, a municipality may wish to tax all local residents for parking at a different rate than non-residents. A mobile commerce electronic device could provide a signal which asserts the residents identification at a parking gate or metered area.

EXAMPLE 17

Taxes Related to the Sales of Fuels or Mobile Insurance

An additional embodiment related to transit occurs when taxes are levied on specific goods or services, such as "pay at the pump automobile insurance." In this embodiment, drivers would possess a mobile commerce electronic device which would identify themselves at a gas station or energy supply station. Based on a driver's identification number which is supplied to the tax directory, a risk adjusted tax would be assessed for insurance for driving the number of miles based on fuel consumption. For example, a particular driver would pay a tax based on previous loss records, number of miles purchased based on the amount of fuel purchased and the location of the purchase. Urban drivers in high accident areas would then be assessed higher taxes for insurance that rural drivers in low accident rural areas. Usage taxes or highway fees could be charged based on the location where a vehicle is used by including a GPS or other tracking device on a vehicle.

EXAMPLE 18

Taxes Related to Sources of Pollution

Another example involves taxes relating to sources of pollution based on location in environmentally sensitive areas. For example, purchases of energy in areas of concentrated pollution may be taxes. Daytime purchases of gasoline in a high ozone area may be taxed based on location, time of day, direction of travel, speed, energy consumed, number of passengers or a variety of inputs. This information may be communicated to the tax authority calculation using a personal communication device.

EXAMPLE 19

Taxes on Wavelength or Network Path of a Wireless Device

An interesting embodiment of taxation based on mobile services and location is the taxation of wavelength or network path usage based on location. For example, a mobile commerce electronic device may access a public network using a wireless technology in an unlicensed, and therefore unregulated band, such a 802.11b (2.4 Ghz), 802.11a (5 Ghz), Bluetooth (2.4 Ghz) or other unregulated spectrum. A grid of unlicensed nodes providing wireless services might be deployed as a computing infrastructure where functionality is partitioned between the mobile commerce electronic device and services provided by computational engines on the grid. In this embodiment, taxes would be based on the purchase of services to a wireless grid network. For example, a public facility such as an airport, a college campus or a shopping district (a concentration of stores within short distance of one another) may decide to offer wireless services based on a common grid or area. An identification would be supplied by the grid to mobile commerce electronic devices, which are used in identification classification within the tax directory. In this way, the supplied location is not the point location of the mobile commerce electronic device, but the area of the grid of services provided by the common district or facility.

EXAMPLE 20

Combinations

Not excluding any of the individual examples of use just described, this invention also recognizes that the functionality of using location of a wireless device to determine that tax rate, performing a tax calculation and collecting and delivering of such taxes will occur using elements of any combination of the above examples or others not listed.

While the principles of the invention have now been made clear in illustrative embodiments, there will be immediately obvious to those skilled in the art many modifications of structure, arrangements, proportions, the elements, materials and components, used in the practice of the invention which are particularly adapted for a specific environment and operating requirements without departing from those principles. These and other changes or modifications are intended to be included within the scope of the invention, as expressed in the following claims.

The invention claimed is:

1. A transaction tax settlement system comprising:
 a personal communication device configured to participate in a transaction, wherein said personal communications device comprises:
  a database for maintaining stored tax rates and stored tax calculation rules when said stored tax rates and said stored tax calculation rules are not subject to modification for a predetermined period of time;
  a location apparatus for determining a geographic location of said personal communications device;
  a tax module for determining when said stored tax rates and said stored tax calculation rules should be modified based on a universally coordinated timestamp provided by a location signal of said location apparatus and connecting to a tax information system to retrieve an update to said stored tax rates and said stored tax calculation rules;

said tax module configured to retrieve said stored tax rates and said stored tax calculation rules when said stored tax rates and said stored tax calculation rules are applicable to said transaction;
a communication network providing two-way communication between said personal communication device and said tax information system;
said tax information system configured to retrieve a list of identified tax authorities when said database does not include said stored tax rates and tax calculation rules applicable to said transaction, wherein said tax information system comprises:
a tax directory having a listing of tax authorities stored thereon, said tax directory configured to facilitate identification of certain of said tax authorities capable of imposing a tax on said transaction based on a type of said transaction, a merchant type, and said geographic location;
said tax directory configured to return said list of said identified tax authorities to said personal communication device such that said personal communications device can allow selection of a subset of said a list of said identified tax authorities, wherein said tax information system does not calculate a tax amount;
said personal communication device configured to send a request directly to said identified tax authorities, wherein said request includes information relating to said transaction; and,
a tax authority calculator corresponding to each of said identified tax authorities, said tax authority calculator configured to facilitate determination of a tax rate and a tax rate calculation rule for said transaction, wherein said tax rate and said tax calculation rule is returned directly to said personal communications device.

2. The system of claim 1, wherein said tax information system further comprises an authorization authority configured to validate a payment modality.

3. The system of claim 1, wherein said tax directory identifies said tax authorities upon receipt of a request, said request including a factor of said transaction.

4. The system of claim 3, wherein said factor comprises at least one of location data, a description of said transaction, and a tax status of a party participating in said transaction.

5. The system of claim 4, wherein said factor comprises location data received from at least one of a seller point of presence, said personal communication device, and a participating third party.

6. The system of claim 1, wherein said personal communication device is configured to submit a request to said tax information system, said request includes factors pertaining to said transaction.

7. The system of claim 6, wherein said tax directory is configured to receive said request and return to said personal communication device information on each of said identified tax authorities.

8. The system of claim 7, wherein said returned information includes a location of each of said identified tax authorities.

9. The system of claim 7, wherein said returned information includes a domain name for each of said identified tax authorities.

10. The system of claim 7, wherein said returned information includes a URI of each of said identified tax authorities.

11. The system of claim 6, wherein said tax information system returns to said personal communication device a location of said tax authority calculator.

12. The system of claim 11, wherein said location includes a domain name of said tax authority calculator.

13. The system of claim 11, wherein said location includes a URI of said tax authority calculator.

14. The system of claim 1, wherein said tax rate comprises at least one of a monetary value, a tax table and a rule.

15. A transactional tax settlement system for use in a buyer and seller transaction over a network, said system comprising:
a personal communication device configured to initiate a purchase request from said seller via said network, wherein said personal communications device comprises;
a database for maintaining stored tax rates and stored tax calculation rules when said stored tax rates and said stored tax calculation rules are not subject to modification for a predetermined period of time;
a location apparatus for determining a geographic location of said personal communications device;
a tax module for determining when said stored tax rates and said stored tax calculation rules should be modified based on a universally coordinated timestamp provided by a location signal of said location apparatus and connecting to a tax information system to retrieve an update to said stored tax rates and said stored tax calculation rules;
said tax module configured to retrieve said stored tax rates and said stored tax calculation rules when said stored tax rates and said stored tax calculation rules are applicable to said purchase request;
a tax information system configured to receive a request from said seller via said network, said request comprising transaction data for said tax information system to consider in facilitating identification of a taxing authority capable of imposing a tax based on said purchase request and said geographic location, and in facilitating calculation of a tax rate and determining a tax rate calculation rule corresponding to said taxing authority;
a tax directory configured to return said identified tax authorities to said seller such that said seller can select a subset of said list of said identified tax authorities, wherein said tax information system does not calculate a tax amount;
said tax information system configured to receive a tax request directly from said seller via said network, wherein said tax request includes information relating to said transaction data; and,
an electronic invoice transmitted directly to said personal communication device, said invoice representative of said purchase and including said tax rate and said tax rate calculation rule.

16. The system of claim 15, wherein said tax information system is configured to validate a payment modality provided to said seller from said buyer.

17. The system of claim 15, wherein said transaction data comprises a tax status of said buyer.

18. The system of claim 15, wherein said transaction data comprises location data from at least one of a seller point of presence, said personal communication device, and a participating third party.

19. A transactional tax settlement system for use in a telecommunications network, said system comprising:
a mobile communication device configured to communicate over a wireless telecommunication network;
a telecommunication service provider configured to facilitate a connection to said wireless telecommunication network by said mobile communication device, wherein said telecommunication service provider comprises;
- a database for maintaining stored tax rates and stored tax calculation rules when said stored tax rates and said stored tax calculation rules are not subject to modification for a predetermined period of time;
- a location apparatus for determining a geographic location of said mobile communications device;
- a tax module for determining when said stored tax rates and said stored tax calculation rules should be modified based on a universally coordinated timestamp provided by a location signal of said location apparatus and connecting to a tax information system to retrieve an update to said stored tax rates and said stored tax calculation rules;
- said tax module configured to retrieve said stored tax rates and said stored tax calculation rules when said stored tax rates and said stored tax calculation rules are applicable to said connection;
- a communication network providing two-way communication between said telecommunication service provider and a tax information system,
- said tax information system configured to retrieve a list of identified tax authorities when said database does not include said stored tax rates and tax calculation rules applicable to said transaction, wherein said tax information system comprises:
  - a tax directory configured to facilitate identification of a list of taxing authorities capable of imposing a tax on said connection; and
  - said tax directory configured to at return said identified tax authority to said telecommunications service provider such that said telecommunications service provider can select a subset of said list of taxing authorities, wherein said tax information system does not calculate a tax amount;
- said tax information system configured to receive a tax request directly from telecommunications service provider, wherein said tax request includes information relating to said transaction data; and,
- a tax authority calculator corresponding to said identified tax authority and configured to facilitate determination of a tax rate and a tax rate calculation rule on said connection, wherein said tax rate and said tax calculation rule is returned directly to said telecommunications service provider.

20. The system of claim 19, further comprising a location identification system configured to identify a location of said mobile communication device.

21. The system of claim 20, wherein said location identification system comprises at least one of a spatial location and a positional location.

22. The system of claim 19, wherein said telecommunication service provider comprises an Internet Service Provider (ISP).

23. A method for facilitating transaction tax settlement at a personal communications device, said method comprising:
- receiving a listing of tax rates and a listing of tax calculation rules from a tax information system;
- grouping a subset of said listing of tax rates and a subset of said listing of tax calculation rules based on whether said listing of tax rates and said listing of tax calculation rules are not subject to modification for a predetermined period of time;
- storing said subset of said listing of tax rates and said subset of said listing of tax calculation rules to create stored taxation rules;
- receiving a request for a transaction, wherein said transaction is subject to said stored taxation data;
- determining, a geographical location of said personal communications device using a location apparatus;
- searching for a tax rate and a tax calculation rule from said taxation data located on said personal communications device based on said request and said geographic location;
- determining when said tax rate and said tax calculation rule is located, whether an update is required of said a tax rate and said tax calculation rule located on said personal communications device based on a universally coordinated timestamp provided by a location signal of said location apparatus;
- receiving an update for said tax rate and said tax calculation rule from a tax information system when said update is required;
- causing said tax information system to retrieve a list of identified tax authorities when said taxation data at said personal communications device does not include said tax rate and said tax calculation rule is applicable to said request, wherein said tax information system includes said listing of tax authorities for facilitating identification of certain of said tax authorities capable of imposing a tax on said transaction based on a type of said transaction, a merchant type, and said geographic location, wherein said tax information system does not calculate a tax amount;
- receiving said list of said identified tax authorities from said tax information system such that said personal communications device can allow selection of a subset of said a list of said identified tax authorities;
- sending a request directly to said identified tax authorities, wherein said request includes information relating to said transaction; and, receiving a tax rate and a tax rate calculation rule for said transaction from said identified tax authorities, wherein said tax rate and said tax calculation rule is returned directly to said personal communications device.

* * * * *